UNITED STATES PATENT OFFICE.

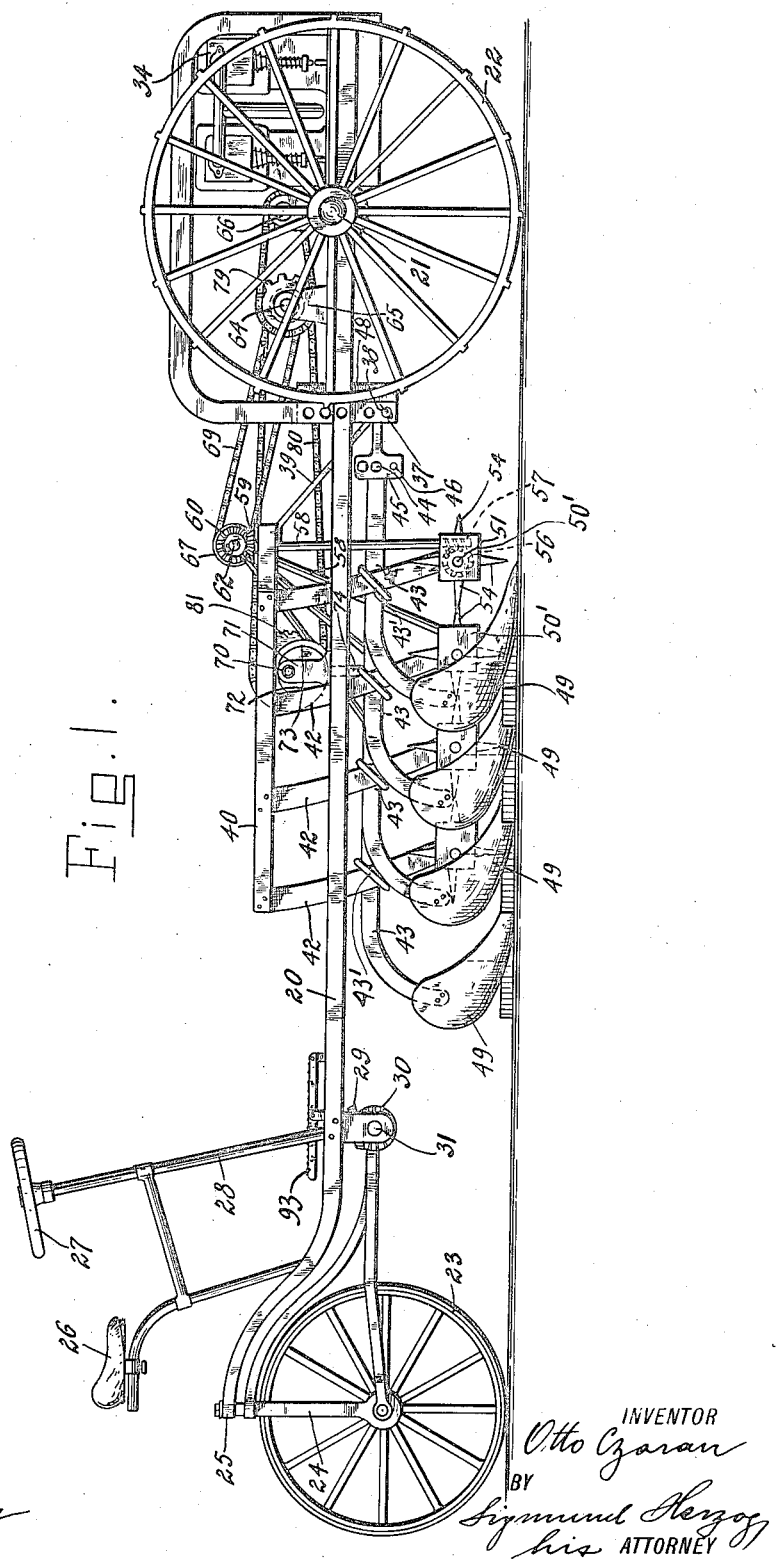

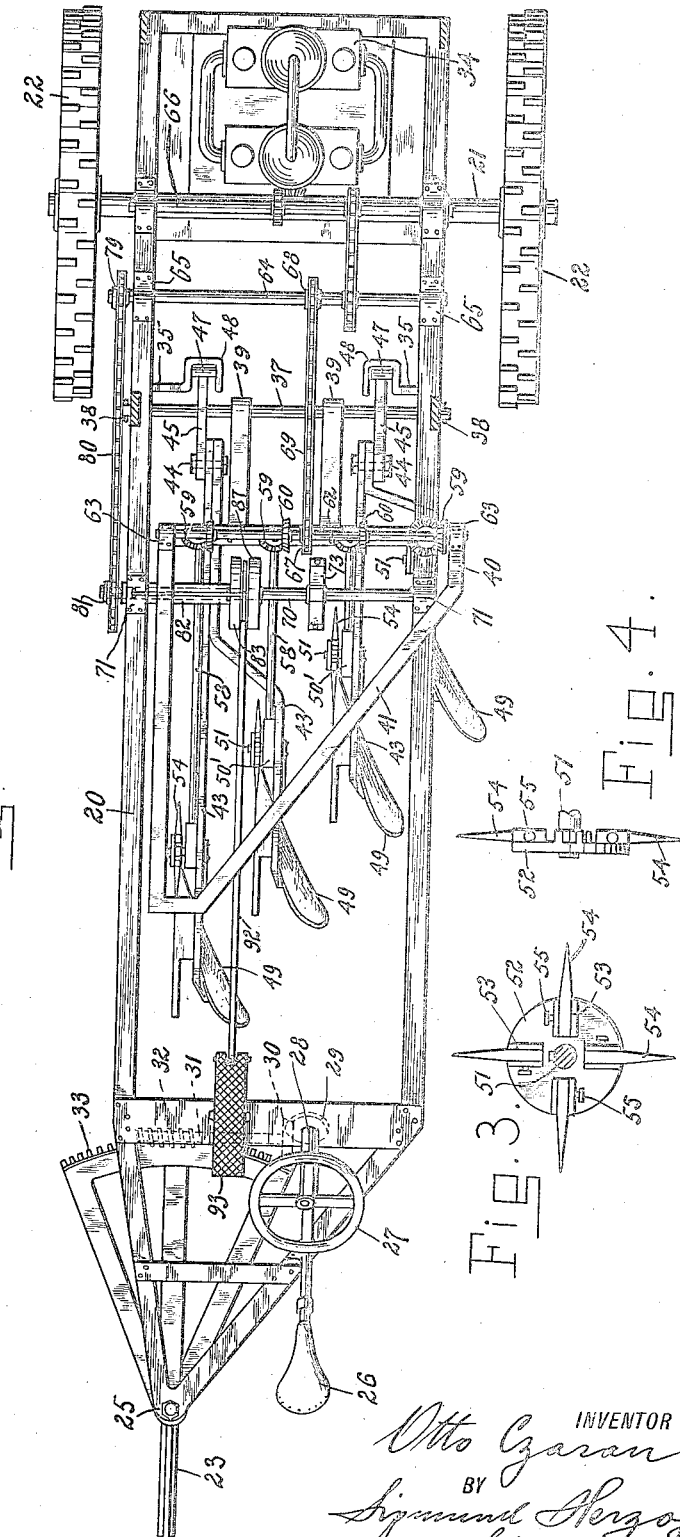

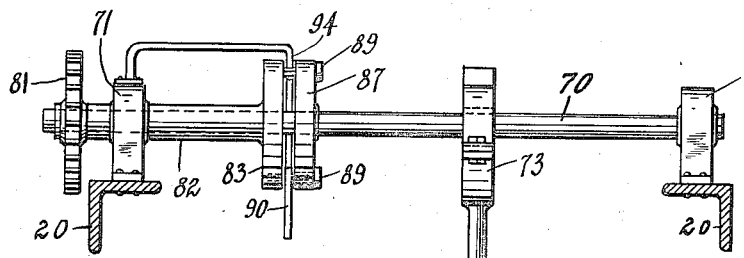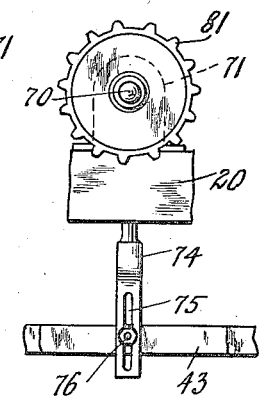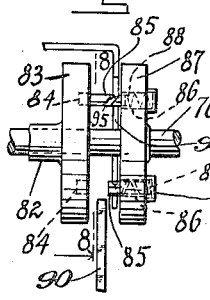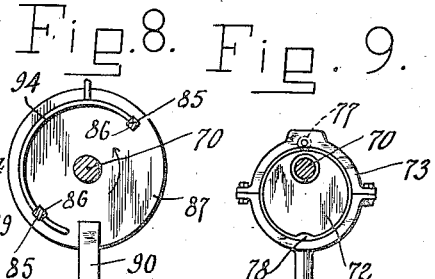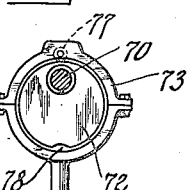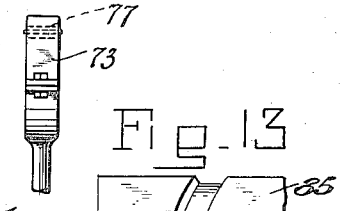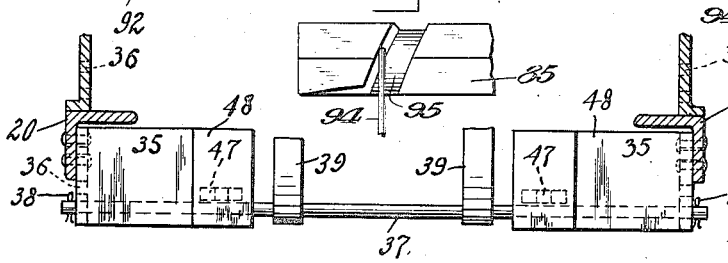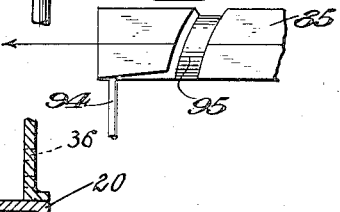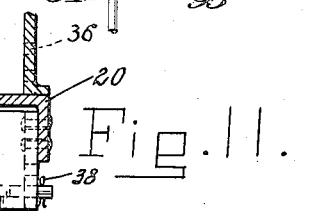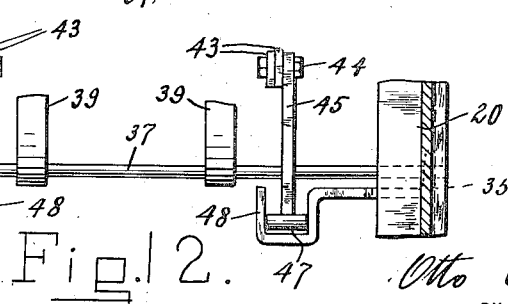

OTTO CZARAN, OF NEW YORK, N. Y.

MOTOR-PLOW.

1,032,118.  Specification of Letters Patent.  Patented July 9, 1912.

Application filed September 20, 1911. Serial No. 650,372.

*To all whom it may concern:*

Be it known that I, OTTO CZARAN, a subject of the King of Hungary, and resident of the city of New York, in the county of Queens and State of New York, have invented certain new and useful Improvements in Motor-Plows, of which the following is a specification.

The present invention relates to an agricultural implement, and more particularly to motor propelled plows.

One of the objects of the invention is to provide such plows with a simple and highly efficient mechanism for propelling the same.

Another object of the invention is to produce a simple mechanism, whereby the turning plow or plows mounted upon the frame of the implement may be adjusted to draw the same into or out of operation, or to accommodate for inequalities in the ground over which the implement passes.

A further object of the invention is to provide a mechanism to permit the positions of the plows to be readily adjusted so as to regulate the depth of the cut.

A still further object of the invention is to provide a plow with rotatable colters having radial digging or cutting blades, and with means for imparting a positive drive to said colters.

With these and other objects in view, which will more fully appear as the nature of the invention is better understood, the same consists in the combination, arrangement and construction of parts hereinafter fully described, pointed out in the appended claims and illustrated in the accompanying drawings, it being understood that many changes may be made in the size and proportion of the several parts and minor details of construction without departing from the spirit or sacrificing any of the advantages of the invention.

One of the many possible embodiments of the invention is illustrated in the accompanying drawings, in which:—

Figure 1 is a side elevation of a cultivator embodying the invention; Fig. 2 is a plan view of the same; Fig. 3 is a side elevation of one of the rotary colters; Fig. 4 is a front elevation of the colter shown in Fig. 3; Fig. 5 is a front elevation, partly in section, of the means for drawing the plows into or out of operation; Fig. 6 is a side elevation of the same; Fig. 7 is an enlarged detail of the means shown in Fig. 5; Fig. 8 is a section taken on line 8—8 of Fig. 7; Fig. 9 is a side elevation of a detail of construction; Fig. 10 is a front elevation of the detail shown in Fig. 9; Fig. 11 is a front elevation of the means for attaching the plow beams to the frame of the implement; and Fig. 12 is a plan view of the detail shown in Fig. 11. Fig. 13 is a front elevation of an enlarged detail of Fig. 7; and Fig. 14 is a similar view of the same detail showing the parts in other positions.

In the drawings, the numeral 20 designates the frame of the implement, which is, preferably, rectangular in form, and supported at its front portion by an axle $21_a$ upon which the traction wheels 22, 22 are mounted. At its rear end the frame is carried by a steering wheel 23, supported in a bifurcated standard 24, the upper end of which is rotatably arranged in a bearing 25, which latter is provided upon the frame 20. The operator's seat is indicated by the numeral 26, and in front of this seat is arranged a steering wheel 27, the post 28 of which is provided at its lower end with a bevel gear 29, meshing with a similar gear 30, which is carried by a shaft 31. Upon this shaft is cut a worm 32, in engagement with a worm gear segment 33, which is rigidly secured in any suitable manner to the standard 24. By means of this arrangement the steering wheel can be given a turning movement in order to direct the travel of the implement.

At its forward end the frame 20 carries a motor 34, preferably an internal combustion engine, the crankshaft of which is connected in any manner known in the art with a differential gear upon the axle 21 of the traction wheels 22; such gear and the connection between the same and the crankshaft of an engine being well known, it is thought that it is not necessary to go into a more detailed description of the same.

In the rear of the traction wheels 22 the longitudinal frame members 20, 20 are each provided with a depending bracket 35, having a plurality of holes 36 therein, the holes in said two brackets registering with each other so as to be adapted to be engaged by a transverse bar 37, which is held in position therein by cotter pins 38, 38. To this bar is attached by means of two inclined frame members 39, 39 a substantially triangular auxiliary frame 40, which is arranged above the plane of the longitudinal members of the frame 20 of the implement. To the diagonally disposed portion 41 of the auxiliary frame 40 are rigidly attached a plurality of substantially vertical downwardly projecting supporting members 42, 42, to the lower ends of which are adjustably fastened by means of clamps 43' the plow beams 43, 43. These beams are arranged in pairs and extend toward the front of the implement. Each pair is fastened to a plate member 45, preferably by means of a bolt 44, passing through said pair and through one of the perforations 46 of the plate, which rests upon the bar 37. These plate members are provided at their forward ends with rollers 47, guided in their upward and downward movement in vertically arranged channel-irons 48, which are either made integral with or attached to the brackets 35 hereinbefore described. To the rear ends of the plow beams 43 are attached in a manner known in the art the turning plows 49, which may be of any suitable size and type, according to the requirements.

In the lower end of each supporting member 42 is rotatably mounted a spindle 51. To this spindle is keyed or otherwise attached a colter comprising a disk 52, provided with radial recesses 53, in which are seated cutters or knives 54, adjustably held therein by set screws 55. The cutters 54 are arranged in front of the turning plows and in the plane of the land-sides of the same. Upon the spindle 51 of each colter is fixedly mounted a worm gear 56, meshing with a worm 57 upon a shaft 58, which latter is suitably journaled in the frame 40, and provided upon its upper end with a bevel gear 59, meshing with a similar gear 60. The bevel gears 60 are keyed to a shaft 62, which is journaled in bearings 63, 63, carried by the frame 40. Rotation is imparted to the shaft 62 from a countershaft 64, which is journaled in bearings 65, 65 upon the main frame of the implement. This countershaft is actuated from the main driving shaft 66, the latter being in turn actuated from the crankshaft of the internal combustion engine 34. The connection between the shafts 62 and 64 consists of sprocket wheels 67 and 68, which are keyed to the shafts 62 and 64, respectively, and over which runs a chain 69. The worm gears 56 and the worms 57 are inclosed by casings 50', which are secured to supporting members 42.

The means for drawing the plows and the colters into and out of operation consists of a mechanism, which is adapted to raise the auxiliary frame 40 and the parts carried thereby. For this purpose a shaft 70 is rotatably mounted in bearings 71, 71, which are carried by the main frame. To this shaft is keyed or otherwise attached an eccentric 72, the strap 73 of which is provided with a yoke-like extension 74, having substantially vertical slots 75, 75, in which are seated bolts 76, 76, which are fastened to the plow beams 43. In the upper portion of the strap 73 is provided a recess, in which is seated a roller 77, adapted to engage a notch 78 in the peripheral portion of the eccentric 72. This notch is formed in that portion of the eccentric which forms the most distant portion thereof with relation to the shaft 70. The purpose of this arrangement will be hereinafter described.

It is obvious that in rotating the shaft 70, the eccentric 72 will act upon the strap 73 and raise thereby the auxiliary frame around the points thereof which are placed upon the bar 37, the auxiliary frame being swung around its pivots. The shaft 70 is actuated from the countershaft 64 by providing the latter with a sprocket wheel 79, engaging a chain 80, which runs over a sprocket wheel 81, the latter being mounted upon a sleeve 82 drawn over a portion of the shaft 70. This sleeve carries a disk 83, provided with two recesses 84, 84 in diametrically opposite points of the same, which recesses are adapted to register with squared pins 85, 85, the latter being slidably arranged in recesses 86, 86 of a disk 87, which is keyed or otherwise attached to the shaft 70. Springs 88, 88, bearing against the pins 85 and against caps 89 upon the disk 87, tend to force the pins against the face of the disk 83. In a vertical line below the shaft 70 and in the path of the pins 85 is arranged a bellcrank lever 90, fulcrumed at 91 to some stationary part of the main frame 20, and connected by means of an actuating rod 92 with a treadle 93, which is located within the reach of the operator occupying the seat 26. In placing his foot upon the treadle 93, the operator can actuate the bellcrank lever 90, and swing the same out of the path of the pins 85 so that one of the same, when reaching its lowermost position, is adapted to enter, under the tension of the spring 88, one of the recesses 84 in the disk 83. Since the disk 83 rotates continuously, rotation will be imparted to the shaft 70 when one of the pins 85 enters one of the recesses 84, until a semi-circular stationary strip 94 in the path of the pin 85 disengages the latter from its recess 84. Each pin is provided with a screw-like groove 95, which is engaged by the strip 94 before said pin reaches its uppermost position. As soon as it is engaged, the pin will be moved against the action of the spring 88 toward the disk 87 and thereby disengaged from the disk 83, more particularly it will be disengaged when said pin reaches its uppermost position. At the same time, however, the other pin reaches its lowermost position, but is kept out of the recess in the disk 83 by the bellcrank lever 90. The strip 94 extends substantially through half of the periphery of the disk 87, and is kept in engagement with a pin until the latter reaches the bellcrank lever 90, when the said pin is disengaged from said strip and engaged with the bellcrank lever.

The operation of the implement is as follows: When the machine has reached a field that is to be cultivated, first the plows are set to cut at the desired depth by placing the bar 37 in the proper holes 36 in the brackets 35, and, if necessary, the bolts 44 in one or the other set of perforations in the plate members 45 to adjust properly the plow beams 43. The treadle 93 is then actuated to lower the plows to their desired positions. When the plow beams are in their uppermost positions, one of the pins 85 is kept by the bell-crank lever 90 in one of the recesses 86 in the disk 87, and the other pin 85 is in engagement with the strip 94, and disengaged from its corresponding recess 84. As soon as the treadle is actuated, the bellcrank lever 90 is swung away from the disk 87, when, under the action of the spring 88, the lower pin 85 will enter one of the recesses 84 as soon as this recess registers with the pin. When engaged with said recess, rotation will be imparted to the shaft 70, whereby the roller 77 of the strap 73 of the eccentric will be unseated from the notch 78 in the eccentric 72, and the frame 40 with the parts carried thereby lowered. As soon as the pin reaches the strip 94, it will be gradually unseated from its recess, and the other pin will be brought opposite to the bellcrank lever 90, which had been in the meantime returned to its normal operative position. In starting now the movement of the implement, the colters, to which rotation is imparted in the manner hereinbefore described, will cut the soil preparatory to its being turned by the mold-boards of the plow, more particularly the colters will perform an initial cutting to facilitate the cutting action of the share of the plow. They will cut the soil effectively as positive rotating movement is imparted to the same. The knives or cutters 54 may be adjusted by means of the set screws 55 to a desired depth, and may be reversed if one of the cutting edges of the same becomes dull. It will be observed that the steering wheel 23 is a furrow wheel, while that traction wheel which is located at the right-hand side of the driver is a land-wheel.

The auxiliary frame 40 with the parts thereon may be lifted whenever the plowing operation is to be stopped, or when an obstruction in the path of the plow is found. The roller 77, in engaging the notch 78 in the eccentric 72, will stop the said eccentric notwithstanding the momentum possessed thereby.

It is obvious that the position of each pair of turning plows can be adjusted independently of the other pair.

Since the plow beams 43 are adjustably fastened by means of the clamps 43' to the supporting members 42, it will be easily seen that the positions of the colters relative to the turning plows may be varied, at will, in order to change the relative depth of cut of said colters.

What I claim is:—

In a power driven implement of the class described, the combination with a main frame, of an auxiliary frame pivotally secured thereto, a plurality of plow beams mounted upon said auxiliary frame, plows carried by said beams, the positions of the pivots upon said main frame being adapted to be varied so as to predetermine the depth of the cut of said plows; colters rotatably mounted upon said beams in front of said plows, means for raising or lowering said plow beams together with the parts attached thereto, and means for imparting rotation to said colters, substantially as and for the purpose specified.

Signed at New York, in the county of New York and State of New York, this 16th day of September, A. D. 1911.

OTTO CZARAN.

Witnesses:
SIGMUND HERZOG,
S. BIRNBAUM.